United States Patent
Yang et al.

(10) Patent No.: US 12,183,013 B1
(45) Date of Patent: Dec. 31, 2024

(54) METHOD AND DEVICE FOR DETECTING LEAKAGE TARGET BY INTEGRATING TEMPORAL INFORMATION

(71) Applicant: CHENGDU GREATECH ELECTRONIC TECHNOLOGY CO., LTD., Sichuan (CN)

(72) Inventors: Bin Yang, Chengdu (CN); Xiang Zhang, Chengdu (CN); Chao Dai, Chengdu (CN)

(73) Assignee: CHENGDU GREATECH ELECTRONIC TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/748,072

(22) Filed: Jun. 19, 2024

(30) Foreign Application Priority Data

Nov. 9, 2023 (CN) .......................... 202311484463.5

(51) Int. Cl.
    *G06T 7/00*     (2017.01)
    *G06T 5/20*     (2006.01)
    (Continued)

(52) U.S. Cl.
    CPC .................. *G06T 7/20* (2013.01); *G06T 5/20* (2013.01); *G06T 5/50* (2013.01); *G06V 10/764* (2022.01);
    (Continued)

(58) Field of Classification Search
    CPC ................... G06V 20/52; G06V 10/82; G06T 2207/10016; G06T 2207/10024;
    (Continued)

(56) References Cited

U.S. PATENT DOCUMENTS

| | | | |
|---|---|---|---|
| 11,080,982 B1 | 8/2021 | Ennaifar et al. | |
| 2004/0017930 A1* | 1/2004 | Kim | G06V 40/161 382/118 |

(Continued)

FOREIGN PATENT DOCUMENTS

| | | |
|---|---|---|
| CN | 111626090 A | 9/2020 |
| CN | 213149817 U | 5/2021 |
| CN | 115063584 A | 9/2022 |

(Continued)

OTHER PUBLICATIONS

Yang, Xinyu, Suhui Liu, and Lulu Zhang. "Analysis of pipeline leakage monitoring based on inter-frame difference method." 2022 IEEE 4th International Conference on Civil Aviation Safety and Information Technology (ICCASIT). IEEE, 2022.*

(Continued)

*Primary Examiner* — Li Liu
(74) *Attorney, Agent, or Firm* — Porus IP LLC

(57) ABSTRACT

A method and system for detecting a leakage target by integrating temporal information. The method comprises: acquiring multiple frames of images of a target position, and arranging the multiple frames of images based on temporal information corresponding to the multiple frames of images to obtain a target image sequence; merging, in a channel dimension, the multiple frames of images in the target image sequence to obtain a multi-dimensional tensor; performing convolution processing on the multi-dimensional tensor to obtain a first output result, wherein the first output result is used for representing a frame difference between every two adjacent ones of the multiple frames of images; calculating an accumulated frame difference corresponding to the multiple frames of images based on the first output result; and inputting the accumulated frame difference to a trained target detection model as input data to obtain a second output result integrated with the temporal information.

10 Claims, 6 Drawing Sheets

(51) Int. Cl.
  *G06T 5/50* (2006.01)
  *G06T 7/20* (2017.01)
  *G06V 10/764* (2022.01)
  *G06V 20/70* (2022.01)
(52) U.S. Cl.
  CPC .... *G06V 20/70* (2022.01); *G06T 2207/20221* (2013.01); *G06V 2201/07* (2022.01)
(58) Field of Classification Search
  CPC ............... G06T 7/0016; G06T 7/254; G06T 2207/20084; G06T 2207/20081; G06T 2207/30108
  See application file for complete search history.

(56) References Cited

U.S. PATENT DOCUMENTS

| | | | | |
|---|---|---|---|---|
| 2013/0286213 | A1* | 10/2013 | Cetin | H04N 23/11 348/164 |
| 2016/0069743 | A1* | 3/2016 | McQuilkin | A22B 5/007 356/416 |
| 2023/0009954 | A1* | 1/2023 | Blonder | G06V 10/255 |
| 2023/0177938 | A1* | 6/2023 | Hsu | G06T 7/174 340/577 |
| 2023/0194420 | A1 | 6/2023 | Cox | |

FOREIGN PATENT DOCUMENTS

| | | |
|---|---|---|
| CN | 115131340 A | 9/2022 |
| CN | 115205541 A | 10/2022 |
| CN | 116630265 A | 8/2023 |
| WO | 2016013719 A1 | 1/2016 |
| WO | 2022134344 A1 | 6/2022 |

OTHER PUBLICATIONS

Zhou, Liming, and Yousheng Zeng. "Automatic alignment of infrared video frames for equipment leak detection." Analytica chimica acta 584.1 (2007): 223-227.*

Ding, Kang, Hanyu Hong, and Likun Huang. "Dangerous gas detection based on infrared video." MIPPR 2017: Remote Sensing Image Processing, Geographic Information Systems, and Other Applications. vol. 10611. SPIE, 2018.*

Spandonidis, Christos, et al. "Evaluation of deep learning approaches for oil & gas pipeline leak detection using wireless sensor networks." Engineering Applications of Artificial Intelligence 113 (2022): 104890.*

Zhang, Jinbo, Research of Pipeline and Valve Leakage Detection Technology In Video Image, Full-text Database of Excellent Master's Dissertations in China (II Series of Engineering Science and Technology), 2021, 92 pages.

Yang, Shengli, Research on Sealing Detection Method of Gas Storage Tank Based on Machine Vision, Full-text Database of Excellent Master's Dissertations in China (I Series of Engineering Science and Technology), 2019, 84 pages.

Wang, Hongxia, The Detection of Advertisement Based on Content in Streaming Media, Opto-Electronic Engineering, 37(10): 99-103, 2010.

Alibek Kopbayev et al., Gas Leakage Detection Using Spatial and Temporal Neural Network Model, Process Safety and Environmental Protection, 160: 968-975, 2022.

First Office Action in Chinese Application No. 202311484463.5 mailed on Dec. 21, 2023, 14 pages.

Decision to Grant a Patent in Chinese Application No. 202311484463.5 mailed on Feb. 1, 2024, 5 pages.

* cited by examiner

METHOD AND DEVICE FOR DETECTING LEAKAGE TARGET BY INTEGRATING TEMPORAL INFORMATION

CROSS REFERENCE TO RELATED APPLICATION

The application claims priority to Chinese patent application No. 202311484463.5, filed on Nov. 9, 2023, the contents of which are incorporated herein.

BACKGROUND

1. Technical Field

The application relates to the technical field of target detection, and particularly, relates to a method and system for detecting a leakage target by integrating temporal information.

2. Description of Related Art

During production in petrochemical plants, leakages of facilities and piping systems possible lead to leaking of chemical substances, causing potential hazards to personnel, facilities and environments. Therefore, regular inspection and maintenance of facilities to ensure the intactness of ports, valves and pipes of the facilities are the key to preventing leakages.

However, conventional manual inspection is not only labor-consuming, but also cannot find anomalies in the first time. In view of this, it is necessary to figure out a leakage target detection method and system to monitor the intactness of facilities and piping systems in real time so as to find a leakage in time.

SUMMARY

In one aspect, the embodiments in the specification provide a method for detecting a leakage target by integrating temporal information, comprising:

acquiring multiple frames of images of a target position, and arranging the multiple frames of images based on temporal information corresponding to the multiple frames of images to obtain a target image sequence;

merging, in a channel dimension, the multiple frames of images in the target image sequence to obtain a multi-dimensional tensor;

performing convolution processing on the multi-dimensional tensor to obtain a first output result, wherein the first output result is used for representing a frame difference between every two adjacent ones of the multiple frames of images;

calculating an accumulated frame difference corresponding to the multiple frames of images based on the first output result; and inputting the accumulated frame difference to a trained target detection model as input data to obtain a second output result integrated with the temporal information.

In some embodiments, the trained target detection model is obtained by training through the following steps:

acquiring a sample video, and extracting k+1 continuous image frames from the sample video;

determining an abustle value of a frame difference between every two adjacent ones of the k+1 continuous image frames to obtain absolute values of k frame differences;

adding the absolute values of the k frame differences to obtain an accumulated frame difference corresponding to the sample video;

constructing a sample data set using the accumulated frame difference as a model input sample;

labelling each model input sample in the sample data set to obtain a label corresponding to each model input sample; and inputting the labelled sample data set to an initial target detection model as input data, and iteratively updating a parameter of the initial target detection model based on the sample data set until a loss function or a number of training epochs reaches a preset threshold, so as to obtain the trained target detection model.

In some embodiments, a labelled object corresponding to the labels is a leakage target in an accumulated frame difference image corresponding to the model input samples; the label corresponding to each model input sample comprises <class id>, <x_center>, <y_center>, <width> and <height>, wherein <class id> is a class corresponding to the target, <x_center> and <y_center> are coordinates of the center of a bounding box corresponding to the target, and <width> and <height> are a width and height of the bonding box.

In some embodiments, the initial target detection model is YOLOv5; output data of the initial target detection model include a prediction result of the bounding box, a probability of the presence of a leakage target, and a class of the leakage target; and the loss function comprises a loss of the bounding box, a loss of the probability of the presence of a leakage target, and a loss of the class of the leakage target.

In some embodiments, iteratively updating a parameter of the initial target detection model based on the sample data set comprises:

estimating moving averages of a primary moment and a secondary moment of a gradient using an Adam optimization algorithm; and updating the parameter of the initial target detection model based on the moving averages of the primary moment and the secondary moment and a current learning rate.

In some embodiments, the parameter of the initial target detection model is updated by the following rule:

$$\theta_{t+1} = \theta_t + \frac{\alpha}{\sqrt{\hat{v}_t} + \varepsilon} \hat{m}_t$$

where, $\theta_{t+1}$, is the parameter after updating, $\theta_t$ is the parameter before updating, $\hat{m}_t$ is the moving average of the primary moment, $\hat{v}_t$ is the moving average of the secondary moment, $\alpha$ is the current learning rate, and $\varepsilon$ is a fixed parameter.

In some embodiments, the method further comprises:

linearly adjusting the current learning rate in the first s training epochs, and adjusting the current learning rate in the last T-s training epochs by a cosine annealing learning rate adjustment strategy, wherein T is a total number of training epochs.

In some embodiments, the cosine annealing learning rate adjustment strategy is specifically as follows:

$$lr(t) = 0.5 lr_{max}\left(1 + \cos\frac{\pi t}{T}\right)$$

where, $lr_{max}$ is a maximum learning rate, T is the total number of training epochs, t is a current training epoch, lr(t) is a learning rate corresponding to the current training epoch, and t>s.

In the other aspect, the embodiments in the specification further provide a system for detecting a leakage target by integrating temporal information, comprising:

an acquisition module used for acquiring multiple frames of images of a target position and arranging the multiple frames of images based on temporal information corresponding to the multiple frames of images to obtain a target image sequence;

a multi-dimensional tensor generation module used for merging, in a channel dimension, the multiple frames of images in the target image sequence to obtain a multi-dimensional tensor;

a convolution processing module used for performing convolution processing on the multi-dimensional tensor to obtain a first output result, wherein the first output result is used for representing a frame difference between every two adjacent ones of the multiple frames of images;

an accumulated frame difference calculation module used for calculating an accumulated frame difference corresponding to the multiple frames of images based on the first output result; and a target detection module used for inputting the accumulated frame difference to a trained target detection model as input data to obtain a second output result integrated with the temporal information.

In some embodiments, the system further comprises a training module specifically used for:

acquiring a sample video, and extracting k+1 continuous image frames from the sample video;

determining an abustle value of a frame difference between every two adjacent ones of the k+1 continuous image frames to obtain absolute values of k frame differences;

adding the absolute values of the k frame differences to obtain an accumulated frame difference corresponding to the sample video;

constructing a sample data set using the accumulated frame difference as a model input sample;

labelling each model input sample in the sample data set to obtain a label corresponding to each model input sample; and inputting the labelled sample data set to an initial target detection model as input data, and iteratively updating a parameter of the initial target detection model based on the sample data set until a loss function or a number of training epochs reaches a preset threshold, so as to obtain the trained target detection model.

The method and system for detecting a leakage target by integrating temporal information provided by the embodiments in the specification possibly fulfil at least the following beneficial effects:

(1) By merging multiple frames of images in a target image sequence in a channel dimension to obtain a multi-dimensional tensor T, information of the multiple frames of images in the time dimension and information of the multiple frames of images in the channel dimension can be represented by the same tensor, such that the temporal relation between the multiple frames of continuous images can be better captured to provide more comprehensive information to reduce false reports and report failures caused by quality problems of instantaneous images or obscuration, thereby improving the accuracy and reliability of leakage target detection based on the multiple frames of images in the subsequent process;

(2) By calculating an accumulated frame difference corresponding to multiple frames of images, an accumulative change in the multiple frames of images can be reflected, a transient or gradually changing anomaly in the time dimension can be captured and can be amplified by the sum of the frame differences to be detected more easily, such that a true anomaly can be more accurately distinguished from an anomaly caused by noise, thus improving the accuracy and reliability of leakage target detection and reducing false alarms;

(3) By determining a frame difference between every two adjacent ones of multiple frames of images by convolution processing, a GPU can be fully used for CUDA acceleration, thus greatly improving the data reasoning speed and endowing a model with the real-time reasoning ability.

Additional features will be partially expounded in the following description. For those skilled in the art, these additional features will be obvious with reference to the following contents and accompanying drawings, or can be understood with the generation or operation of examples. The features in the application may be implemented and obtained by practicing or using methods, tools, and combinations expounded in the following detailed examples.

BRIEF DESCRIPTION OF THE DRAWINGS

The application will be further described in the specification in conjunction with illustrative embodiments, and these illustrative embodiments will be described in detail with reference to accompanying drawings and are non-restrictive. In these embodiments, identical reference signs indicate identical structures. Wherein.

DETAILED DESCRIPTION

Figure 1:
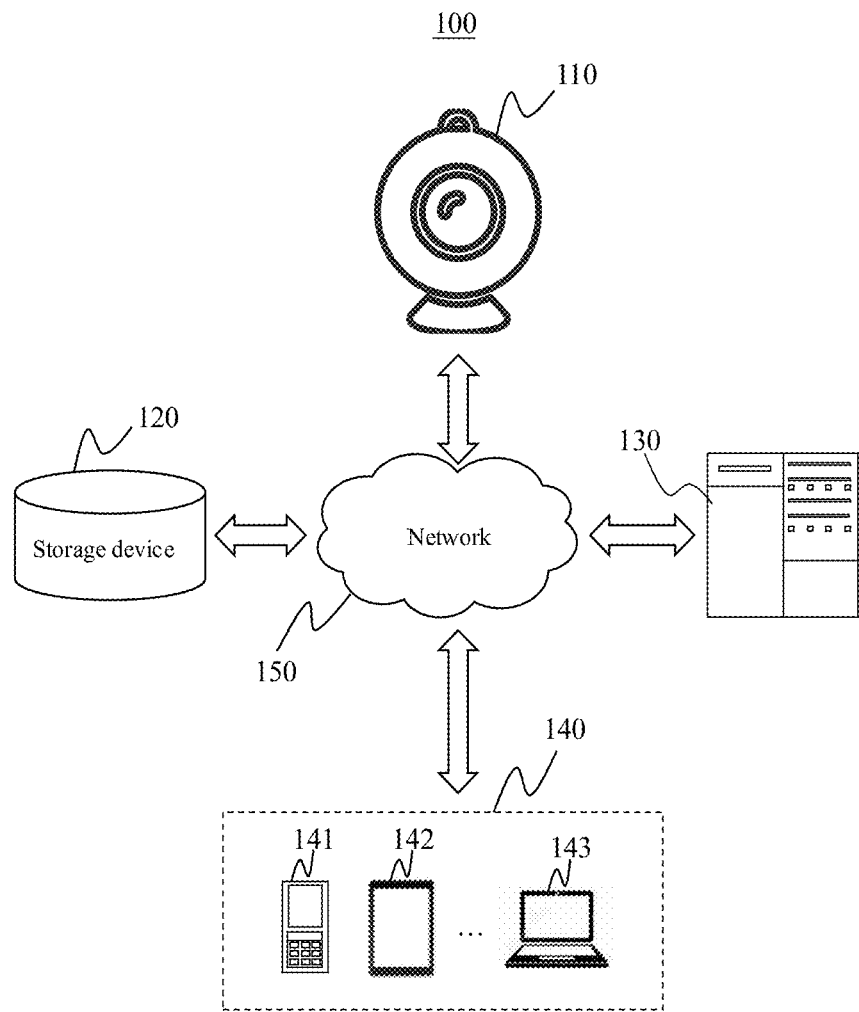
FIG. 1 is a scenario diagram of an illustrative application of a system for detecting a leakage target by integrating temporal information according to some embodiments in the specification.

To more clearly explain the technical solutions of embodiments in the specification, drawings used for describing the embodiments will be briefly introduced below. Obviously, the drawings in the following description merely illustrate some examples or embodiments of the application, and those ordinarily skilled in the art can apply the application to other similar scenarios according to these drawings without creative labor. Unless otherwise easily appreciated from the context or stated, identical reference signs in the drawings indicate identical structures or operations.

It should be understood that "system", "device", "unit" and/or "module" in the specification are used for distinguishing accessories, elements, components, parts or assemblies and may be replaced with other expressions that can fulfill the same purpose.

As indicated in the description and claims, unless otherwise expressly stated, terms such as "a/an", "one", and/or "said" do not refer in particular to a singular form, and may also refer to a plural form. Generally, terms "comprise" and "include" only indicate the inclusion of clearly listed steps and elements which are enumerated not for an exclusive purpose, and a method or device may also include other steps or elements.

A flow diagram is used in the specification to illustrative operations performed by a system according to the embodiments in the specification. It should be understood that the operations do not necessarily need to be performed accurately in an order as shown by the flow diagram. In fact, these steps can be performed in a reverse order or synchronously. Moreover, other operations can be added in these processes, or a certain step or several steps can be removed from these processes.

Leakage of a facility or piping system refers to medium seepage or leakage caused by improper management (such as damage to the facility or piping system) or improper operation during storage or transportation or in use of liquid or gas. In some embodiments, a camera may be installed at a critical position where a leakage possibly occurs to capture real-time images continuously, and then accurate real-time recognition of the leakage may be performed based on the image recognition technique. When detecting a sign of leaking, a system automatically sends an alarm to ensure that field operators can take corresponding measures quickly.

However, it is difficult to recognize small leakage targets such as liquid drops by means of a single frame of image acquired by the camera, so traditional leakage target detection based on a single frame of image usually has the problems of high false alarm rate and high alarm failure rate.

In view of this, in order to improve the accuracy and reliability of leakage target detection, the embodiments in the specification provide a method and system for detecting a leakage target by integrating temporal information. The method and system provided by the embodiments in the specification will be described in detail below in conjunction with accompanying drawing.

FIG. 1 is a schematic diagram of an illustrative application scenario of a system for detecting a leakage target by integrating temporal information according to some embodiments in the specification.

Referring to FIG. 1, in some embodiments, an application scenario 100 of a system for detecting a leakage target by integrating temporal information may comprise an image acquisition unit 110, a storage device 120, a processing device 130, a terminal device 140 and a network 150. The components in the application scenario 100 may be connected in many ways. For example, the image acquisition unit 110 may be connected to the storage device 120 and/or the processing device 130 through the network 150, or may be connected to the storage device 120 and/or the processing device 130 directly. For another example, the storage device 120 may be connected to the processing device 130 directly or through the network 150. For another example, the terminal device 140 may be connected to the storage device 120 and/or the processing device 130 by means of the network 15 or directly.

The image acquisition unit 110 may be used for acquiring images of any position of a facility or piping system, and the images can reflect a leakage of the facility or piping system. In some embodiments, the image acquisition unit 110 may be used for acquiring infrared images or visible images of a target position. In a case where the image acquisition unit 110 is used for acquiring infrared images of the target position, the image acquisition unit 110 may be an infrared thermal imager. Illustratively, the infrared thermal imager may be a FLIR E8 infrared thermal imager, a FLIR ONE thermal imager, a Seek Thermal imager, a FLUKE thermal imager, etc. In a case where the image acquisition unit 110 is used for acquiring visible images of the target position, the image acquisition unit 110 may be an image sensor, for example, a complementary metal-oxide-semiconductor (CMOS), a charge-coupled device (CCD), or the like. Because the infrared thermal imager has a high cost and a small application range and may be disturbed by the change of temperature during the infrared image acquisition process, in the embodiments of the specification, the image sensor is preferably used for acquiring visible images of the target position. In some embodiments, a corresponding fill light device may be arranged at the target position to ensure that clear images of the target position can be acquired.

In some embodiments, the image acquisition unit 110 may acquire images of a monitored position of the facility or piping system at a set image acquisition frequency, for example, every 5 s. In some embodiments, the image acquisition unit 110 may acquire images of the target position continuously to obtain a real-time surveillance video of the target position. In some embodiments, the image acquisition unit 110 may be arranged on a pan-tilt-zoom assembly to realize all-directional monitoring and photographing. In some embodiments, multiple (for example, two or more) image acquisition units 110 may be configured in the application scenario 100 to acquire images of the same target position or different target positions. In some embodiments, the image acquisition unit 110 may be equipped with an independent power supply or send acquired images (or videos) to other components (for example, the storage device 120, the processing device 130 and the terminal device 140) in the application scenario 100 in a wired manner or wireless manner (for example, through Bluetooth or WiFi).

In some embodiments, the image acquisition unit 110 may send acquired images (videos) to the storage device 120, the processing device 130 and the terminal device 140 through the network 150. In some embodiments, the images (or videos) acquired by the image acquisition unit 110 may be processed by the processing device 130. For example, the processing device 130 may obtain a second output result integrated with temporal information based on the images (videos) and determine whether a leakage occurs to the facility or piping system based on the second output result. In some embodiments, the second output may be sent to the storage device 120 to be recorded or sent to the terminal device 140 to be fed back to users (for example, related management staff).

The network 150 can promote information and/or data exchange, and may be any suitable network that can promote information and/or data exchange in the application scenario 100. In some embodiments, at least component (for example, the image acquisition unit 110, the storage device 120, the processing device 130 and the terminal device 140) in the application scenario 100 may exchange information and/or data with at least one another component in the application scenario 100. For example, the processing device 130 may acquire the images (videos) of the target position from the image acquisition unit 110 and/or the storage device 120 through the network 150. For another example, the processing device 130 may acquire user operation instructions from the terminal device 140 through the network 150. Illustratively, the operation instructions may comprise, but not limited to, accessing the images (videos), reading the second output result determined based on the images (videos), etc.

In some embodiments, the network 150 may be any wired or wireless networks or any combination thereof. As an example, the network 150 may be a cable network, a wired network, an optical network, a remote communication network, an internal network, an internet, a local area network (LAN), a wide area network (WAN), a wireless local area network (WLAN), a metropolitan area network (MAN), a public switched telephone network (PSTN), a Bluetooth network, a ZigBee network, a near field communication (NFC) network, or any combination thereof. In some embodiments, the network 150 may comprise at least one network access point, and at least one component in the application scenario 100 may be connected to the network 150 by means of the access point to exchange data and/or information.

The storage device 120 may store data, instructions, and/or any other information. In some embodiments, the storage device 120 may store data acquired from the image acquisition unit 110, the processing device 130 and/or the terminal device 140. For example, the storage device 120 may store the images (or videos) acquired by the image acquisition unit 110. For another example, the storage device 120 may store the second output result calculated by the processing device 130. In some embodiments, the storage device 120 may store data and/or instructions executed or used by the processing device 130 to implement illustrative methods described in the specification. In some embodiments, the storage device 120 may be a mass memory, a mobile memory, a volatile read-write memory, a read only memory (ROM), or any combination thereof. Illustratively, the mass memory may be a magnetic disk, an optical disk, a solid-state disk, or the like. In some embodiments, the storage device 120 may be implemented on a cloud platform. Merely as an example, the cloud platform may be a private cloud, a public cloud, a hybrid cloud, a community cloud, a distributed cloud, an internal cloud, a multi-layer cloud, or any combination thereof.

In some embodiments, the storage device 120 may be connected to the network 150 to communicate with at least one other component (for example, the image acquisition unit 110, the processing device 130 or the terminal device 140) in the application scenario 100. At least one component in the application scenario 100 may access data, instructions or other information stored in the storage device 120 through the network 150. In some embodiments, the storage device 120 may be directly connected to or communicate with one or more other components (for example, the image acquisition unit 110 and the terminal device 140) in the application scenario 100. In some embodiments, the storage device 120 may be one part of the image acquisition unit 110 and/or the processing device 130.

The processing device 130 may process data and/or information acquired form the image acquisition unit 110, the storage device 120, the terminal device 140 and/or other components in the application scenario 100. In some embodiments, the processing device 140 may acquire the images (or videos) of the target position from any one or more of the image acquisition unit 110, the storage device 120 and the terminal device 140, and process the images (or videos) to determine the second output result. In some embodiments, the processing device 130 may acquire pre-stored computer instructions from the storage device 120 and execute these computer instructions to implement a method for detecting a leakage target by integrating temporal information described in the specification.

In some embodiments, the processing device 130 may be a single server or a server group. The server group may be centralized or distributed. In some embodiments, the processing device 130 may be local or remote. For example, the processing device 130 may access information and/or data in the image acquisition unit 110, the storage device 120 and/or the terminal device 140 through the network 150. For another example, the processing device 130 may be directly connected to the image acquisition unit 110, the storage device 120 and/or the terminal device 140 to access information and/or data. In some embodiments, the processing device 130 may be implemented on a cloud platform. For example, the cloud platform may be a private cloud, a public cloud, a hybrid cloud, a community cloud, a distributed cloud, or any combination thereof.

The terminal device 140 may receive, send and/or display data. Data received by the terminal device 140 may comprise data acquired by the image acquisition unit 110, data stored in the storage device 120, the second output result obtained by the processing device 130, etc. Data sent by the terminal device 130 may comprise data and instructions input by users (for example, related management staff), etc. For example, the terminal device 140 may send operation instructions input by users to the image acquisition unit 110 through the network 150 to control the image acquisition unit 110 to acquire corresponding data. For another example, the terminal device 140 may send operation instructions input by users to the processing device 130 through the network 150.

In some embodiments, the terminal device 140 may be a mobile device 141, a tablet computer 142, a laptop computer 143, or any combination thereof. For example, the mobile device 141 may be a mobile phone, a personal digital assistant (PDA), a dedicated mobile terminal, or any combination thereof. In some embodiments, the terminal device 140 may comprise an input device (for example, a keyboard or a touch screen), an output device (for example, a display or a speaker), etc. In some embodiments, the processing device 130 may be one part of the terminal device 140.

It should be noted that the above description of the application scenario 100 is merely for a purpose of illustration and explanation and is not intended to limit the application range of the specification. For those skilled in the art, various amendments and modifications can be made to the application scenario 100 under the guidance of the specification, and all these amendments and modifications should also fall within the scope of the specification. For example, the image acquisition unit 110 may comprise more or less functional components.

Figure 2:
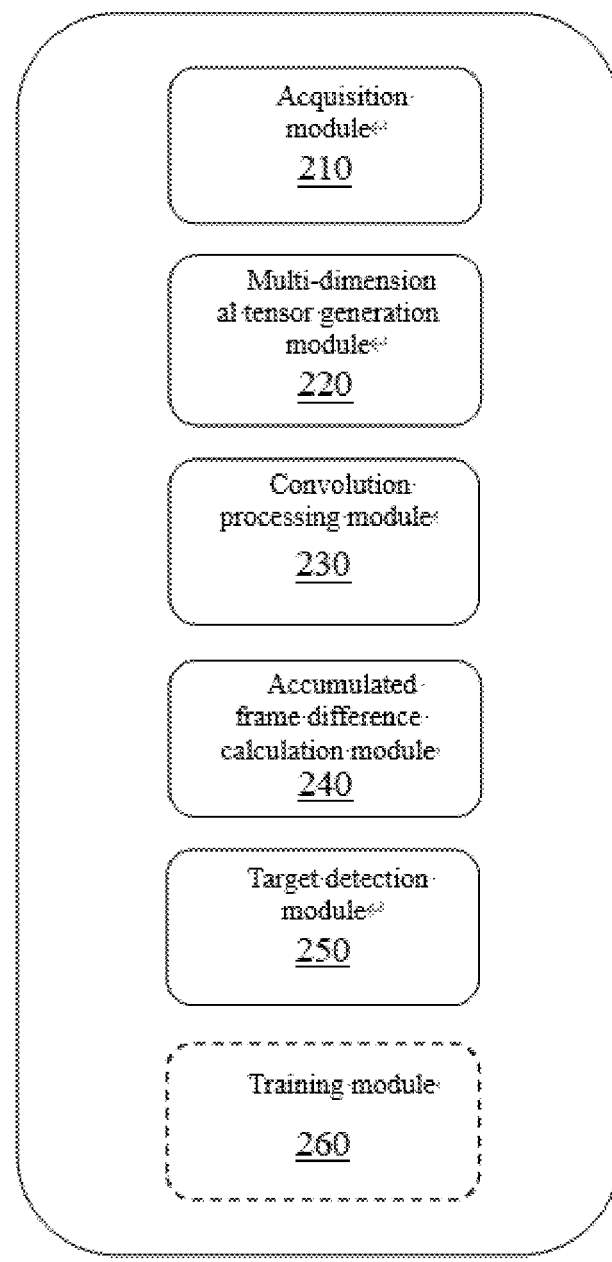
FIG. 2 is an illustrative module diagram of the system for detecting a leakage target by integrating temporal information according to some embodiments in the specification.

FIG. 2 is a schematic module diagram of the system for detecting a leakage target by integrating temporal information according to some embodiments in the specification. In some embodiments, the system 200 for detecting a leakage target by integrating temporal information shown in FIG. 2 may be applied to the application scenario 100 shown in FIG. 1 in the form of software and/or hardware. For example, the system 200 may be configured in the processing device 130 and/or the terminal device 140 in the form of software and/or hardware to process the images acquired by the image acquisition unit 110 and determine the second output result based on the images.

Referring to FIG. 2, in some embodiments, the system 200 for detecting a leakage target by integrating temporal information may comprise an acquisition module 210, a multi-dimensional tensor generation module 220, a convolution processing module 230, an accumulated frame difference calculation module 240 and a target detection module 250.

The acquisition module 210 may be used for acquiring multiple frames of images of a target position and arranging the multiple frames of images based on temporal information corresponding to the multiple frames of images to obtain a target image sequence.

The multi-dimensional tensor generation module 220 is used for merging, in a channel dimension, the multiple frames of images in the target image sequence to obtain a multi-dimensional tensor.

The convolution processing module 230 is used for performing convolution processing on the multi-dimensional tensor to obtain a first output result, wherein the first output result is used for representing a frame difference between every two adjacent ones of the multiple frames of images.

The accumulated frame difference calculation module 240 is used for calculating an accumulated frame difference corresponding to the multiple frames of images based on the first output result.

The target detection module 250 is used for inputting the accumulated frame difference to a trained target detection model as input data to obtain a second output result integrated with the temporal information.

Further referring to FIG. 2, the system 200 for detecting a leakage target by integrating temporal information may further comprise a training module 260, which may be used for:

acquiring a sample video, and extracting k+1 continuous image frames from the sample video;

determining an abustle value of a frame difference between every two adjacent ones of the k+1 continuous image frames to obtain absolute values of kframe differences;

adding the absolute values of the k frame differences to obtain an accumulated frame difference corresponding to the sample video;

constructing a sample data set using the accumulated frame difference as a model input sample;

labelling each model input sample in the sample data set to obtain a label corresponding to each model input sample; and inputting the labelled sample data set to an initial target detection model as input data, and iteratively updating a parameter of the initial target detection model based on the sample data set until a loss function or a number of training epochs reaches a preset threshold, so as to obtain the trained target detection model.

More details of the above modules can be obtained with reference to other parts of the specification (for example, FIG. 3-FIG. 6 and related descriptions) and will not be repeated herein.

It should be understood that the system 200 for detecting a leakage target by integrating temporal information shown in FIG. 2 and the modules thereof may be implemented in various ways. For example, in some embodiments, the system and the modules thereof can be implemented by hardware, software, or the combination of software and hardware. Wherein, the hardware may be implemented by means of special logic. The software may be stored in a memory and executed by a suitable instruction execution system such as a micro processing unit or specially designed hardware. Those skilled in the art can appreciate that the method and system described above may be implemented by means of computer executable instructions and/or control codes in a processor, for example, codes provided on a medium carrier such as a magnetic disk, a CD or a DVD-ROM, a programmable memory such as a read only memory (firmware), or a data carrier such as an optical or electric signal carrier. The system and modules thereof in the specification may be implemented, for example, by means of a hardware circuit of a super-large-scale integration circuit or gate array, a semiconductor such as a logic chip and a transistor, or a programmable hardware device such as a field programmable gate array or a programmable logic device, or may be implemented by means of software executed by various types of processors, or may be implemented by the combination (for example, firmware) of the hardware circuit and the software.

It should be noted that the above description of the system 200 for detecting a leakage target by integrating temporal information is provided merely for the purpose of explanation and is not intended to limit the scope of the specification. It can be understood that those skilled in the art can freely combine the above modules, or integrate the above modules into a subsystem connected to other modules. For example, the acquisition module 210, the multi-dimensional tensor generation module 220, the convolution processing module 230, the accumulated frame difference calculation module 240 and the target detection module 250 in FIG. 2 may be different modules in the same system, or one module may fulfill the functions of two or more modules. For another example, the system 200 for detecting a leakage target by integrating temporal information may further comprise a preprocessing module used for performing preprocessing, such as denoising or enhancement, on the images described above. All such transformations should fall within the protection scope of the specification. In some embodiments, the above modules may be one part of the processing device 130 and/or the terminal device 140.

Figure 3:
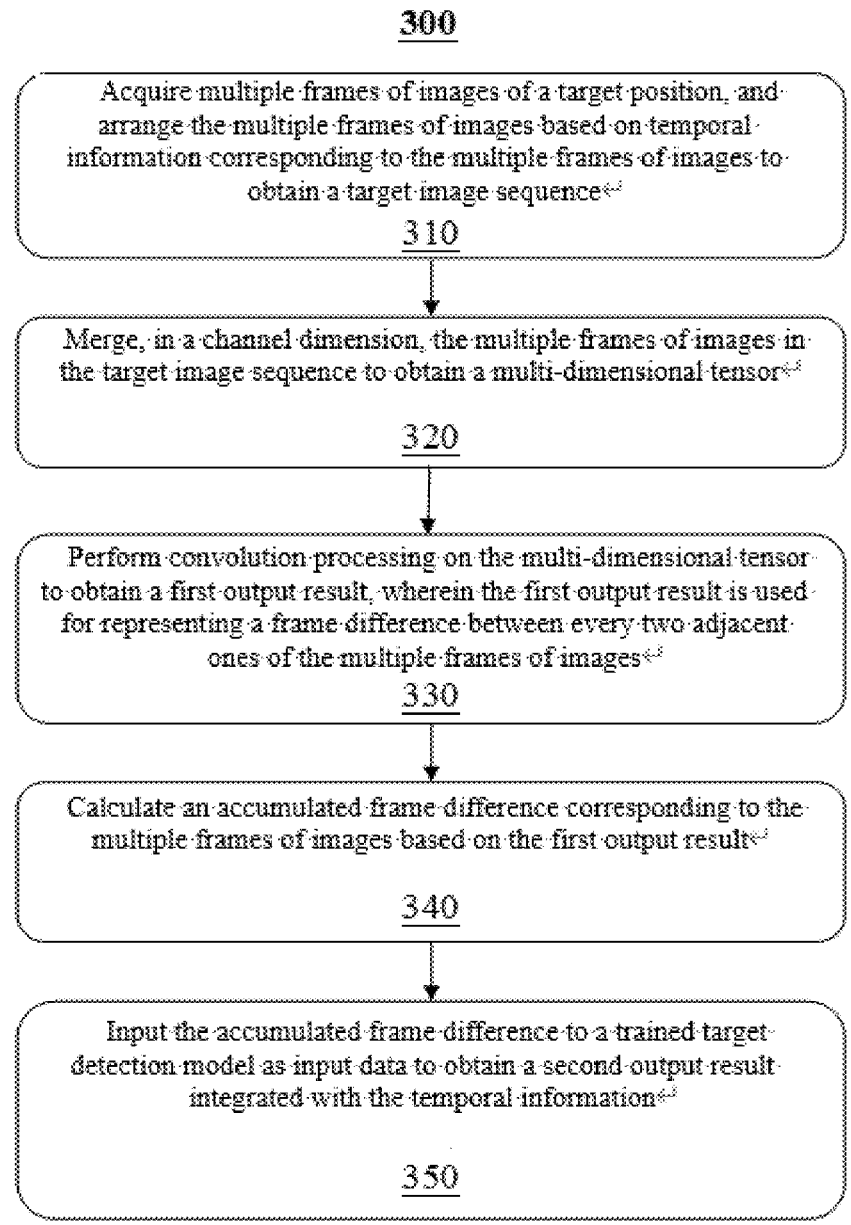
FIG. 3 is an illustrative flow diagram of a method for detecting a leakage target by integrating temporal information according to some embodiments in the specification.

FIG. 3 is an illustrative flow diagram of a method for detecting a leakage target by integrating temporal information according to some embodiments in the specification. In some embodiments, the method 300 may be implemented by processing logic, and the processing logic may comprise hardware (for example, circuits, special logic, programmable logic and micro-codes), software (running on a processing device to perform instructions simulated by hardware), and any combination thereof. In some embodiments, one or more operations in the flow diagram of the method for detecting a leakage target by integrating temporal information shown in FIG. 3 may be implemented by the processing device 130 and/or terminal device 140 shown in FIG. 1. For example, the method 300 may be stored in the storage device 120 in the form of instructions and invoked and/or executed by the processing device 130 and/or the terminal device 140. The implementation process of the method 300 performed by the processing device 130 is described below by way of example.

Referring to FIG. 3, in some embodiments, the method 300 for detecting a leakage target by integrating temporal information may comprise:

Step 310, multiple frames of images of a target position are acquired and arranged based on temporal information corresponding to the multiple frames of images to obtain a target image sequence. In some embodiments, Step 310 may be performed by the acquisition module 210.

In some embodiments, images (or videos) of a target position of a facility or piping system acquired by the image acquisition unit 110 may be stored in the storage device 120, and the acquisition module 210 may acquire multiple frames of images of the target position from the storage device 120 and arrange the multiple frames of images based on temporal information corresponding to the multiple frames of images to obtain a target image sequence. In some embodiments, the acquisition module 210 may be in communication connection with the image acquisition unit 110 to directly acquire multiple frames of images of the target position from the image acquisition unit 110 and arrange the multiple frames of images based on temporal information corresponding to the multiple frames of images to obtain the target image sequence.

In some embodiments, the multiple frames of images of the target position may be obtained by extracting multiple continuous image frames from a real-time surveillance video acquired by the image acquisition unit 110. In some embodiments, the target image sequence comprising the multiple frames of images may be set as $Q_{updated}$, and the size of the target image sequence may be set as 11, that is, the target image sequence may comprise 11 frames of continuous images. Every time a new frame of image $f_{new}$ is read, the target image sequence may be updated into:

$$Q_{updated} = \text{append}(Q_{old}, f_{new})$$

Elements are removed from the head of the target image sequence, and $Q_{old}$ is updated:

$$Q_{updated} = \text{pop\_front}(Q_{updated})$$

$$Q_{old} = Q_{updated}$$

where, $Q_{old}$ denotes the image sequence before updating, $Q_{updated}$ is the image sequence after updating (the latest target image sequence). Further, after the target image sequence is updated, $Q_{updated}$ may be used as the image sequence $Q_{old}$ before next updating.

It should be noted that the number of frames of continuous images in the target image sequence is merely illustrative, and in some embodiments, the size of the target image sequence may be other values.

In some embodiments, after the target image sequence is obtained, preprocessing, such as image denoising, image enhancement, size adjustment, color space conversion and morphological processing, may be performed on the multiple frames of images in the target image sequence. After being preprocessed, the multiple frames of images in the target image sequence may have the same height h and width w. It should be noted that, in some embodiments of the specification, the height h and width w may refer to the number of pixels in each of the multiple frames of images in the height direction and the number of pixels in each of the multiple frames of images in the width direction.

Step 320, the multiple frames of images in the target image sequence are merged in a channel dimension to obtain a multi-dimensional tensor. In some embodiments, Step 320 may be performed by the multi-dimensional tensor generation module 220.

After the target image sequence is obtained, the multi-dimensional tensor generation module 220 may merge the 11 frames of continuous images in $Q_{updated}$ in the channel dimension to obtain a multi-dimensional tensor T, which may be expressed as:

$$T = \text{Concatenate}_{channel}(Q_{t+1})$$

where, the dimension of the multi-dimensional tensor T is 33×h×w, and h and w are the height and width of each frame of image. Specifically, each pixel comprises three color channels RGB, and after the 11 frames of continuous images in the target image sequence are merged in the channel dimension, the multi-dimensional tensor with the dimension 33×h×w may be obtained.

It should be pointed out that, in the embodiments of the specification, by merging multiple frames of images in the target image sequence in the channel dimension to obtain the multi-dimensional tensor T, information of the multiple frames of images in the time dimension and information of the multiple frames of images in the channel dimension can be represented by the same tensor, such that the temporal relation between the multiple frames of continuous images can be better captured to provide more comprehensive information to reduce false reports and report failures caused by quality problems of instantaneous images or obscuration, thereby improving the accuracy and reliability of leakage target detection based on the multiple frames of images in the subsequent process.

Step 330, convolution processing is performed on the multi-dimensional tensor to obtain a first output result, wherein the first output result is used for representing a frame difference between every two adjacent ones of the multiple frames of images. In some embodiments, Step 330 may be performed by the convolution processing module 230.

After the multi-dimensional tensor T is obtained, convolution processing may be performed on the multi-dimensional tensor by the convolution processing module 230 to obtain the first output result used for representing the frame difference between every two adjacent ones of the multiple frames of images.

In the embodiments of the specification, frame differences between adjacent images may refer to differences, corresponding to the color channels, of corresponding pixels in the adjacent images. Specifically, in some embodiments, a convolution kernel W may be defined as a 30×33×1×1 tensor during convolution processing, and each 1×1 convolution kernel may be used for calculating a specific frame difference. In some embodiments, the specific frame difference may refer to the sum of differences, corresponding to each color channel, of the pixels in the adjacent images. In some embodiments, the last two dimensions can be ignored, and visual convolution kernels in the dimensions (input channel and output channel) are shown in FIG. 4.

Figure 4:
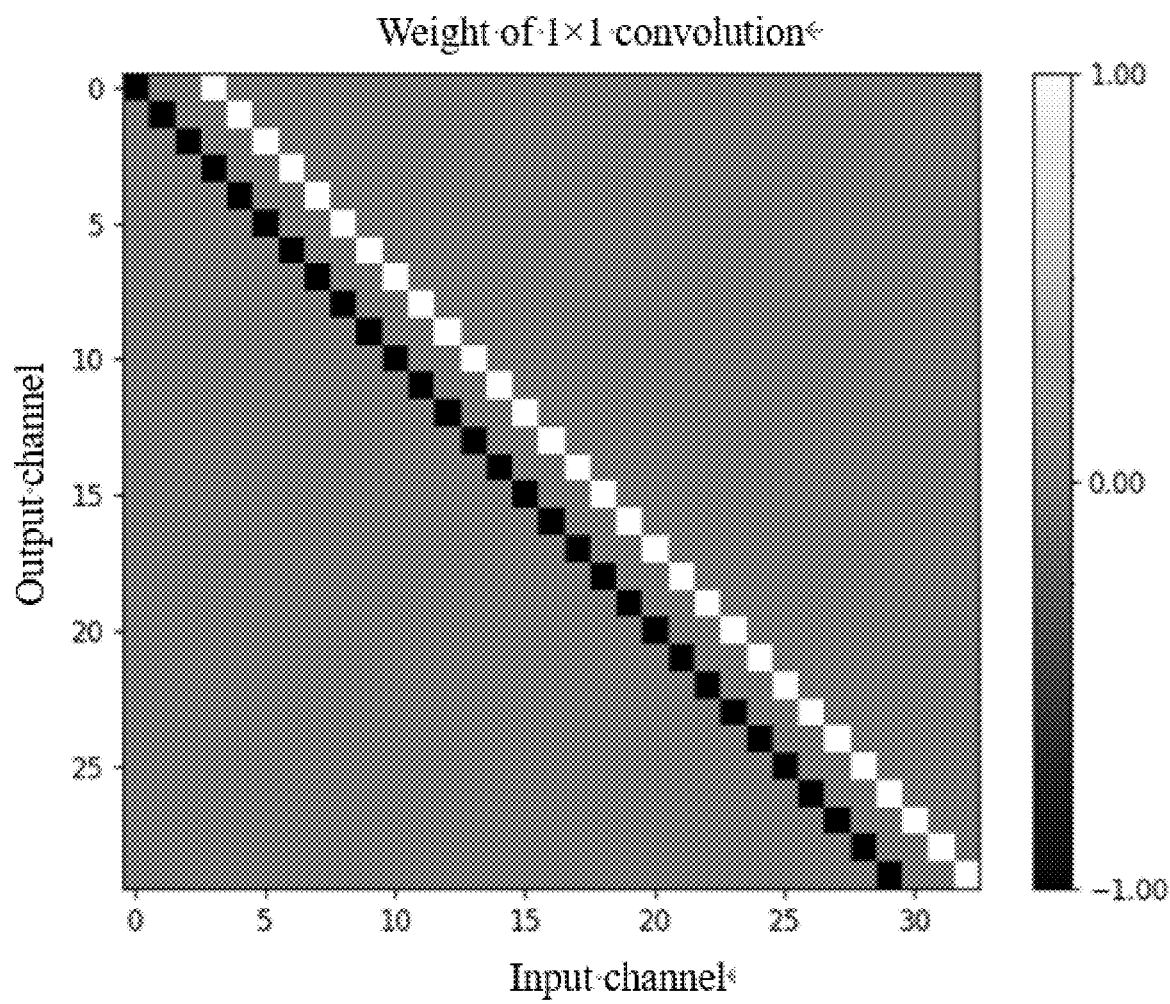
FIG. 4 is a schematic diagram of visual convolution kernels in two dimensions (an input channel and an output channel) according to some embodiments in the specification.
Figure 5:
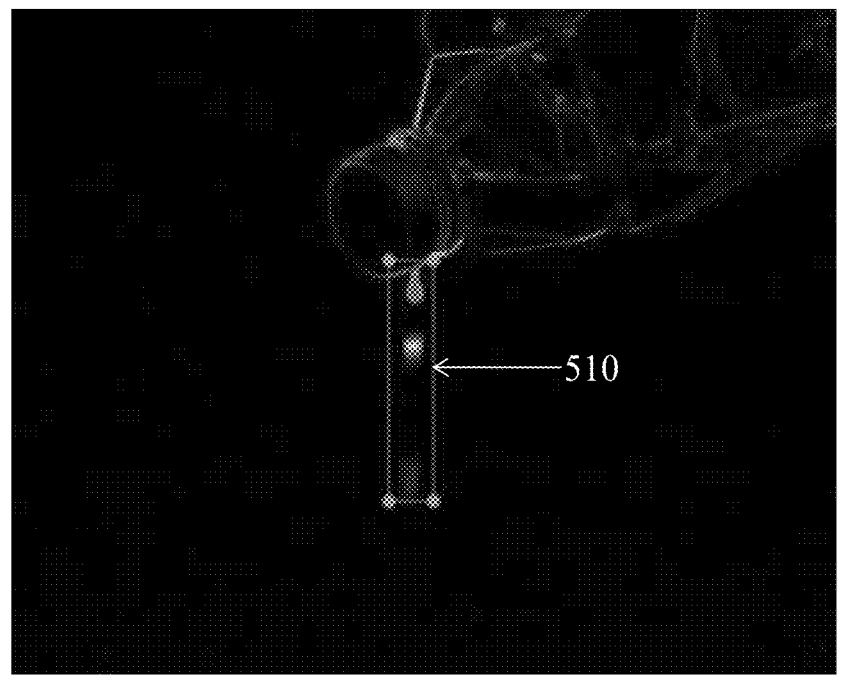
FIG. 5 is a schematic diagram of a target labelled by a data set according to some embodiment in the specification.

In FIG. 4, the input channel indicates the dimension of an input sequence, the output channel indicates the dimension of an output sequence, and the input channel and the output channel are two parameters of 1×1 convolution and determine the weight of the convolution kernel, wherein the weight of the convolution kernel is $\{-1, 0, 1\}$. It should be noted that, in the embodiments of the specification, the channel dimension of input data can be linearly transformed by 1×1 convolution without changing the space dimension. By adjusting the weight of the convolution kernel, weighted combination of channels in input data can be realized by 1×1 convolution to obtain a new channel representation.

In some embodiments, the convolution operation may be defined as:

$$C = \text{Conv2D}(T, W)$$

where, C is an output after convolution (the first output result for representing the frame difference between every two adjacent ones of the multiple frames of images), the dimension of which is 30×h×w; T is the multi-dimensional tensor; W is the convolution kernel.

It should be pointed out that, in the embodiments of the specification, by determining the frame difference between every two adjacent ones of multiple frames of images by convolution processing, a graphics processing unit (GPU) can be fully used for compute unified device architecture (CUDA) acceleration, thus greatly improving the data reasoning speed and endowing a model with the real-time reasoning ability.

Step 340, an accumulated frame difference corresponding to the multiple frames of images is calculated based on the first output result. In some embodiments, Step 340 may be performed by the accumulated frame difference calculation module 240.

After the first output result is obtained by the convolution operation, the accumulated frame difference corresponding to the multiple frames of images may be calculated by the accumulated frame difference calculation module 240 based on the first output result. In some embodiments, the accumulated frame difference may be calculated by:

$$S_1 = \sum_{i=1,4,7,\ldots,28} C_{abs,i}$$

$$S_2 = \sum_{i=2,5,8,\ldots,29} C_{abs,i}$$

$$S_3 = \sum_{i=3,6,9,\ldots,30} C_{abs,i}$$

$$O = \text{Concatenate}_{channel}(S_1, S_2, S_3)$$

where, O denotes the accumulated frame difference corresponding to the multiple frames of images, $S_1$, $S_2$ and $S_3$ respectively denote accumulated channel differences corresponding to the three channels, $C_{abs}=|C|$, and C denotes the output of the convolution operation. In some embodiments, the accumulated frame difference O may be obtained by adding $S_1$, $S_2$ and $S_3$, and the dimension of the accumulated frame difference O is 3×h×w.

It should be noted that, in the above calculation process, $C_{abs,1}$, $C_{abs,2}$ and $C_{abs,3}$ may denote absolute values of the frame differences, corresponding to the three channels, between the first frame of image and the second frame image of the multiple frames of images. By analogy, $C_{abs,4}$, $C_{abs,5}$ and $C_{abs,6}$ may denote absolute values of the frame differences, corresponding to the three channels, between the second frame of image and the third frame of image of the multiple frames of images, . . . , and $C_{abs,28}$, $C_{abs,29}$ and $C_{abs,30}$ may denote absolute values of the frame differences, corresponding to the three channels, between the tenth frame of image and the eleventh frame of image of the multiple frames of images.

It should be further noted that, in the embodiments of the specification, by calculating the accumulated frame difference corresponding to multiple frames of images, an accumulative change in the multiple frames of images can be reflected, a transient or gradually changing anomaly in the time dimension can be captured and can be amplified by the sum of the frame differences to be detected more easily, such that a true anomaly can be more accurately distinguished from an anomaly caused by noise, thus improving the accuracy and reliability of leakage target detection and reducing false alarms.

In some embodiments, Step 320-Step 340 may be configured as one block. Specifically, Step 320-Step 340 may be performed by one processing model, the multi-dimensional tensor T is input the processing model, and then the processing model processes the multi-dimensional tensor T to output the accumulated frame difference O. This process may be expressed as:

$$O = \text{TemporalDifferenceModel}(T)$$

where, TemporalDifferenceModel is the block defined by Step 320-Step 340, T is the multi-dimensional tensor, and O is the accumulated frame difference corresponding to the multiple frames of images.

Step 350, the accumulated frame difference is input to a trained target detection model as input data to obtain a second output result integrated with the temporal information. In some embodiments, Step 350 may be performed by the target detection module 250.

After the accumulated frame difference O corresponding to the multiple frames of images is obtained through the above steps, the accumulated frame difference may be input by the target detection module 250 to the trained target detection model as input data to obtain the second output result integrated with the temporal information. A leakage can be accurately and efficiently detected in real time according to the second output result to better guarantee the safety in petrochemical plants.

Specifically, in some embodiments, the trained target detection model may be trained by the training module 2601. The specific training process may be as follows:

First, the training module 260 may acquire one or more sample videos of the target position of the facility or piping system and then extract k+1 continuous image frames from the sample video. In the embodiments of the specification, k may be 10 or set as other values.

Further, the training module 260 may determine an abustle value of a frame difference between every two adjacent ones of the k+1 continuous image frames to obtain absolute values of k frame differences. Similar to the above description, the absolute value of the frame difference may refer to the sum of differences, corresponding to each color channel, of pixels in the adjacent images.

Further, the training module 260 may add the absolute values of the k frame differences to obtain an accumulated frame difference corresponding to the sample video and construct a sample data set using the accumulated frame difference as a model input sample.

Specifically, in some embodiments, the training module 260 may acquire a complete N-frame sample video and then express the complete sample video frame-by-frame:

$$V = \{f_1, f_2, f_3 \ldots f_N\}$$

Where, V denotes the complete sample video, and $f_i$ denotes an $i^{th}$ frame of the complete sample video.

The training module 260 may select k+1 continuous image frames to form a sub-sample video $S_i$, which may be expressed as:

$$S_i = \{f_i, f_{i+1}, f_{i+2} \ldots f_{i+k}\}$$

It can be known from above that N-k sub-sample videos can be obtained in total based on the complete N-frame sample video.

Further, the training module 260 may calculate a frame difference between every two adjacent image frames in each sub-sample video and calculate the absolute value of the frame difference, thus obtaining the absolute value of the frame difference is obtained. In some embodiments, the absolute value of the frame difference may be expressed as:

$$d_{i,j} = |f_{i+j} - f_{i+j-1}|$$

where, $d_{i,j}$ is the absolute value of the frame difference between the $(i+j)^{th}$ image frame and the $(i+j-1)^{th}$ image frame in the $i^{th}$ sub-sample video, and j=1, 2, ..., k.

Further, the absolute values of the k frame differences corresponding to each sub-sample video are added to obtain a model input sample $M_i$, which may be expressed as:

$$M_i = \sum_{j=1}^{k} d_{i,j}$$

It can be known frame above that N-k model input samples can be obtained based on the complete N-frame sample video. A sample data set D may be constructed by means of the N-k model input samples. The sample data set D may be expressed as:

$$D=\{M_1, M_2, M_3, \ldots, M_{N-k}\}$$

In some embodiments, more model input samples can be obtained by acquiring multiple complete sample videos to improve the diversity of sample data, thus improving the generalization ability and robustness of the model.

Further, the training module 260 may label each model input sample in the sample data set D to obtain a label corresponding to each model input sample. Finally, the training module 260 may input the labelled sample data set to an initial target detection model as input data, and iteratively update a parameter of the initial target detection model based on the sample data set until a loss function or a number of training epochs reaches a preset threshold, so as to obtain the trained target detection model.

In some embodiments, a labelled object corresponding to the labels may be a leakage target (for example, a liquid drop) in an accumulated frame difference image corresponding to the model input sample. The accumulated frame difference image may be appreciated as an image representing a movement area or trajectory of the leakage target generated by accumulation of the frame differences between multiple frames of continuous images corresponding to the model input sample (see FIG. 5).

In some embodiments, the label corresponding to each model input sample may comprises <class id>, <x_center>, <y_center>, <width> and <height>, wherein <class id> is a class corresponding to the leakage target in the accumulated frame difference image corresponding to the model input sample, <x_center> and <y_center> are coordinates of the center of a bounding box (see box 510 in FIG. 5) corresponding to the target, and <width> and <height> are a width and height of the bonding box.

In some embodiments, the bounding box of the leakage target in the accumulated frame difference image corresponding to each model input sample may be obtained by determining a minimum enclosing rectangle of the movement area of the leakage target. In some embodiments, <x_center> may be the ratio of the x-coordinate of the center of the bounding box to the width of the image, <y_center> may be the ratio of the y-coordinate of the center of the bounding box to the height of the image, <width> may be the ratio of the width of the bounding box to the width of the image, and <height> may be the ratio of the height of the bounding box to the height of the image. That is, the value of <x_center>, the value of <y_center>, the value of <width> and the value of <height> may be from 0 to 1.

In some embodiments, the label may be identical with the name of the sample to make the correspondence between data annotations and samples clear and identical to simplify data reading and processing. specifically, the label satisfies:

$$BaseName(s)=BaseName(l)$$

where, BaseName is a base name (not including the extension) of a file, s denotes the model input sample, and l denotes the label corresponding to the model input sample.

Through the above process, the sample data set can be labelled. After the sample data set is labelled, the labelled sample data set may be input to the initial target detection model as input data to perform training.

In some embodiments, the initial target detection model may be YOLOv5 (YOLOv5 is a deep learning-based target detection model), and output data of the initial target detection model may comprise a prediction result of the bounding box (including the coordinates of the center of the bounding box, and the width and height of the bounding box), a probability of the presence of a leakage target, and a class of the leakage target. In some embodiments, the loss function may comprise a loss of the bounding box, a loss of the probability of the presence of a leakage target, and a loss of the class of the leakage target.

Specifically, in some embodiments, the initial target detection model may be defined by:

$$F: R^{H \times W \times 3} \to R^{H \times W \times (4+1+C)}$$

where, F denotes a forward transfer function of YOLOv5, which can receive one or more H×W×3 images and output a predicted tensor, 4 denotes the prediction result of the bounding box (including x, y, width and height), 1 denotes the probability of the presence of a leakage target, and C denotes the class. It should be noted that the model YOLOv5 used in the embodiments of the specification is merely illustrative. In some embodiments, the initial target detection model may be other target detection models such as YOLOv4, YOLOv3, single shot multibox detector (SSD) and Faster R-CNN.

In some embodiments, the model input samples and the multiple frames of H×W×3 images corresponding to each model input sample may be input to the model, such that temporal information is introduced based on a traditional target detection model to improve the processing function of the model. In other words, in some embodiments, based on the traditional target detection model, the number of channels is kept identical with traditional image inputs to remain the height h and width w of images unchanged, and then the model input sample $M_i$ obtained based on the accumulated frame difference of multiple frames of continuous images and image inputs of the traditional target detection model are merged, to introduce temporal information to the traditional single-frame target detection model.

It should be pointed out that, in the embodiments of the specification, by taking into account multiple frames of continuous images, a transient or gradually changing anomaly in the time dimension can be captured by the model, a true anomaly can be distinguished from transient noise or a false report, thus reducing false alarms. In addition, for small targets such as liquid drops, abnormal features can be amplified by information reflected by the multiple frames of continuous images, such that an anomaly can be detected more easily.

In some embodiments, the loss function may be defined by:

$$L=L_{box}+\lambda_{obj}L_{obj}+\lambda_{cls}L_{cls}$$

where, L is a total loss obtained by calculation, $L_{box}$ denotes the loss of the prediction result of the bounding box, $L_{obj}$ indicates the loss of the probability of the presence of a leakage target, $L_{cls}$ denotes the loss of the class, and $\lambda_{obj}$ and $\lambda_{cls}$ are weights of $L_{obj}$ and $L_{cls}$ respectively. It should be noted that the loss herein is a parameter for evaluating the difference between a prediction result of the model and the actual condition (the corresponding label), and in some embodiments, the difference may be calculated by means of cross entropy or binary cross entropy.

In some embodiments, $\lambda_{obj}$ and $\lambda_{cls}$ may be from 0 to 1. In some embodiments, to increase the proportion of the influence of the loss $L_{obj}$ of the probability of the presence of a leakage target in the loss function, $\lambda_{obj}$ may be set to be greater than $\lambda_{cls}$. Illustratively, in some embodiments, $\lambda_{obj}$ may be set to 0.5, and $\lambda_{cls}$ may be set to 0.3. In some embodiments, $\lambda_{obj}$ and $\lambda_{cls}$ may be both set to 0.5. In some embodiments, $\lambda_{obj}$ and $\lambda_{cls}$ may be adjusted according to different sample data sets.

In some embodiments, an Adam optimization algorithm may be used for optimizing the parameter of the model. Specifically, a gradient may be calculated by:

$$g_t = \nabla_\theta J(\theta),$$

where, $g_t$ denotes the gradient in a $t^{th}$ step (the gradient corresponding to a $t^{th}$ training epoch), and each training epoch may be understood as a cycle in which the model traverses all the model input samples in the sample data set. The formula indicates that the partial derivative of all components of the parameter $\theta$ of the model is calculated to obtain a vector. Specifically, in order to update the parameter $\theta$ of the model, the parameter of the model needs to be updated and optimized in a direction opposite to the gradient to decrease the value of an objective function J. In some embodiments, the objective function J may refer to the loss function described above.

Further, the training module 260 may be used for updating moving averages of a primary moment and a secondary moment:

$$m_t = \beta_1 m_{t-1} + (1-\beta_1)g_t$$

$$v_t = \beta_2 v_{t-1} + (1-\beta_2)g_t^2$$

where, $m_t$ and $v_t$ are respectively an estimation of the primary moment and an estimation of the secondary moment, and $\beta_1$ and $\beta_2$ are attenuation factors. In some embodiments, $\beta_1$ and $\beta_2$ may be hyper-parameters between 0 and 1. Illustratively, in some embodiments, $\beta_1$ and $\beta_2$ may be 0.9 and 0.999 respectively.

In some embodiments, $m_t$ and $v_t$ may be respectively regarded as an estimation of the mean and an estimation of the square deviation of the gradient $g_t$, and the training module 260 may update the parameter of the initial target detection model based on the moving averages of the primary moment $m_t$ and the secondary moment $v_t$ and a current learning rate. Wherein, the moving average of the primary moment $m_t$ may refer to a new sequence obtained by calculating the arithmetic mean of each element in a data sequence, a plurality of elements ahead of said element, and a plurality of elements behind said element; and the sliding average of the secondary moment $v_t$ may refer to a new sequence obtained by calculating the square deviation of each element in a data sequence, a plurality of elements ahead of said element, and a plurality of elements behind said element. In the embodiments of the specification, by determining the moving averages of the primary moment $m_t$ and the secondary moment $v_t$, a long-term trend and regular change of data can be extracted, and abnormal points and sudden change points can be detected at the same time.

In some embodiments, the parameter of the initial target detection model may be updated specifically by the following rule:

$$\theta_{t+1} = \theta_t + \frac{\alpha}{\sqrt{\hat{v}_t} + \varepsilon}\hat{m}_t,$$

where, $\theta_{t+1}$, is the parameter after updating, $\theta_t$ is the parameter before updating, $\hat{m}_t$ is the moving average of the primary moment, $\hat{v}_t$ is the moving average of the secondary moment, $\alpha$ is the current learning rate, and $\varepsilon$ is a fixed parameter. In the embodiments of the specification, $\varepsilon$ is an extremely small figure used for preventing the denominator from being 0, which may otherwise make the formula invalid. Illustratively, in some embodiments, $\varepsilon$ may be 0.001.

Figure 6:
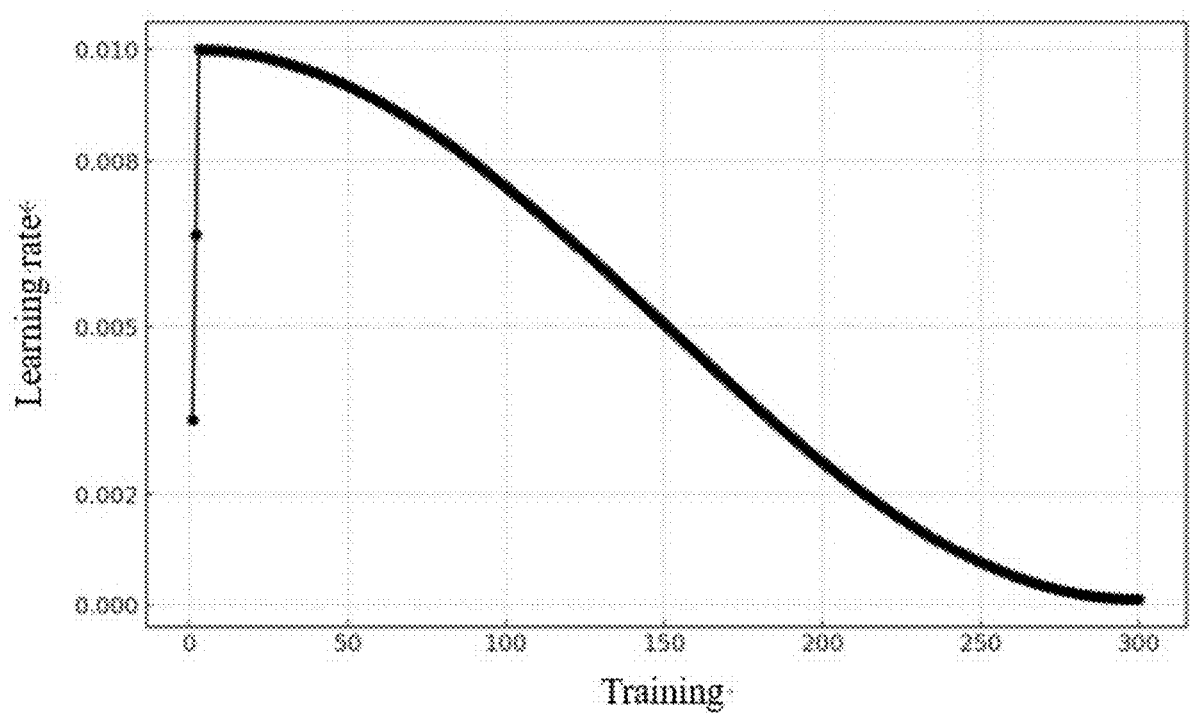
FIG. 6 is a schematic diagram of a learning rate adjustment curve during the training process according to some embodiments in the specification.

FIG. 6 is a schematic diagram of a learning rate adjustment curve during the training process according to some embodiments in the specification.

Referring to FIG. 6, in some embodiments, to increase the convergence rate at the early stage of training, the current learning rate $\alpha$ may be linearly adjusted in the first s training epochs to linearly increase the learning rate in the first several epochs.

Further referring to FIG. 6, to prevent the model from being trapped into a local optimal point during the training process, a good optimal point may be found at the later stage of training. In some embodiments, the current learning rate $\alpha$ may be adjusted by a cosine annealing learning rate adjustment strategy in the last T-s training epochs. Wherein T is a total number of training epochs. In some embodiments, s may be 5.

Specifically, in some embodiments, the cosine annealing learning rate adjustment strategy may be expressed as:

$$lr(t) = 0.5 lr_{max}\left(1 + \cos\frac{\pi t}{T}\right)$$

where, $lr_{max}$ is a maximum learning rate, T is the total number of training epochs, t is a current training epoch, lr(t) is a learning rate corresponding to the current training epoch, and t>s.

During the optimization process of the model, the model will traverse all the model input samples in the sample data set in each training epoch, and the parameter of the model will be updated in each iteration to reduce the total loss L calculated by the loss function. In some embodiments, when the total loss L calculated based on the loss function or the number of training epochs reaches a preset threshold, training will be ended, and the trained target detection model is obtained. It should be noted that the preset threshold may be set as actually needed and is not limited in the specification.

Similar to Step 320-Step 430, during the training process, the process of acquiring of k+1 of continuous image frames from the sample video and the process of calculating the accumulated frame difference of the samples corresponding to the sample video may be integrated into one block, and may be implemented by convolution processing, such that a GPU can be fully used to increase the data processing speed.

After the trained target detection model is obtained by training according to the above steps, the accumulated frame difference obtained by processing multiple frames of images in the previous process may be input to the trained target detection model as input data to obtain a second output result integrated with temporal information. This process may be expressed as:

$$O = \text{TemporalDifferenceModel}(T)$$

$$Y = \text{YOLO}(O)$$

where, O is the accumulated frame difference calculated based on multiple frames of images, TemporalDifferenceModel is the block corresponding to the process of determining the accumulated frame difference O based on the multi-dimensional tensor T corresponding to the multiple frames of images, and YOLO denotes the target detection model YOLOv5, and Y is an output integrated with temporal information of the YOLOv5 model (the second output result). The probability of the presence of a leakage target at the target position and the class of the leakage target can be accurately reflected by the second output result.

In some embodiments of the specification, TemporalDifferenceModel and YOLO may be combined to be configured on the GPU to accelerate reasoning.

In can be known, from the above, that in the embodiments of the specification, by evaluating the severity of a leakage based on k+1 frames of previous visible images, the leaking condition at different times can be accurately obtained to prevent various emergencies. In addition, in some embodiments, a threshold may be set for monitoring, and in case of continuous leaking, a security protection system in the plant can give an alarm to inform technicians of perform maintenance in time, so as to ensure the stability, safety and high efficiency of the production process.

It can be understood that accurate detection of leakages of facilities and piping systems in petrochemical plants it is an important measure for guaranteeing the stability, safety and high efficiency of the production process, and is also an important task that should be taken seriously during chemical production. The method and system for detecting a leakage target by integrating temporal information provided by the embodiments of the specification can improve the accuracy and reliability of leakage target detection to some extent, reduce the detection omission rate and detection error rate, guarantee the product quality, improve the production efficiency, and lower the safety risk.

To sum up, the embodiments in the specification can fulfill, but not limited to, the following beneficial effects: (1) according to the method and system for detecting a leakage target by integrating temporal information provided by some embodiments in the specification, by merging multiple frames of images in the target image sequence in a channel dimension to obtain the multi-dimensional tensor T, information of the multiple frames of images in the time dimension and information of the multiple frames of images in the channel dimension can be represented by the same tensor, such that the temporal relation between the multiple frames of continuous images can be better captured to provide more comprehensive information to reduce false reports and report failures caused by quality problems of instantaneous images or obscuration, thereby improving the accuracy and reliability of leakage target detection based on the multiple frames of images in the subsequent process; (2) according to the method and system for detecting a leakage target by integrating temporal information provided by some embodiments in the specification, by calculating the accumulated frame difference corresponding to multiple frames of images, an accumulative change in the multiple frames of images can be reflected, a transient or gradually changing anomaly in the time dimension can be captured and can be amplified by the sum of the frame differences to be detected more easily, such that a true anomaly can be more accurately distinguished from an anomaly caused by noise, thus improving the accuracy and reliability of leakage target detection and reducing false alarms; (3) according to the method and system for detecting a leakage target by integrating temporal information provided by some embodiments in the specification, by determining the frame difference between every two adjacent ones of multiple frames of images by convolution processing, a GPU can be fully used for CUDA acceleration, thus greatly improving the data reasoning speed and endowing the model with the real-time reasoning ability.

It should be noted that different embodiments may fulfill different beneficial effects, and in different embodiments, any one or more of the above beneficial effects or any other possible beneficial effects may be fulfilled.

Basic concepts have been described above. Obviously, for those skilled in the art, the above detailed disclosure is merely exemplary, and is not intended to limit the specification. Although not expressly specified herein, those skilled in the art can make various modifications, improvements and amendments to the specification as suggested in the specification, so all these modifications, improvements and amendments should also fall within the spirit and scope of the illustrative embodiments in the specification.

Moreover, specific terms are used in the specification to describe the embodiments. For example, "an embodiment", "one embodiment", and/or "some embodiments" are intended to describe a characteristic, structure or feature related to at least one embodiment in the specification. Therefore, it should be emphasized and noted that "an embodiment", "one embodiment" or "an alternative embodiment" mentioned twice or more times in different positions of the specification do not definitely refer to the same embodiment. In addition, certain characteristics, structures or features in one or more embodiments in the specification may be properly combined.

In addition, those skilled in the art should understand that all aspects in the specification can be explained and described with various patentable categories or cases, including any new and useful combinations of processes, machines, products or substances, or any new and useful improvements of the processes, machines, products or substances. Correspondingly, all aspects in the specification can be implemented completely by hardware, completely by software (including firmware, resident software and microcodes), or by the combination of hardware and software. The hardware or software may be referred to as "data block", "module", "engine", "unit", "component" or "system". Moreover, all aspect in the specification may be manifested as a computer product located in one or more computer-readable media, and the computer product comprises computer-readable program codes.

The computer storage medium may comprise a data propagation signal containing computer program codes, for example, on a baseband or as one part of a carrier. The propagation data signal may be in various forms, such as an electromagnetic form, an optical form, or any suitable combinational forms. The computer storage medium may be any computer-readable media other than computer-readable storage media, and may be connected to an instruction execution system, device or facility to implement a program for communication, propagation or transmission. Program codes located on the computer storage medium may be propagated by any suitable media, including radio, electric cables, optical cables, RF, similar media, or any combination of these media.

Computer program codes required for part of operations in the specification may be written in any one or more program languages, including object-oriented programming languages such as Java, Scala, Smalltalk, Eiffel, JADE, Emerald, C++, C#, VB.NET and Python, conventional procedural programming languages such as C language, Visual Basic, Fortran2003, Perl, COBOL2002, PHP and ABAP, dynamic programming language such as Python, Ruby and Groovy, and other programming language. The program codes may run completely on a user computer, or run on the user computer as an independent software package, or partially run on the user computer and partially run on a remote computer, or completely run on the remote computer or a processing device. In the latter case, the remote computer may be connected to the user computer through any network, such as a local area network (LAN) or a wide area network (WAN), or connected to an external computer (for example, through an internet), or be in a cloud computation environment, or be used as a service such as software as a service (SaaS).

In addition, unless otherwise expressly stated in the claims, the order of processing elements and sequences, the use of numbers and alphabets, or the use of other names in the specification is not intended to limit the order of the processes and methods in the specification. Although some invention embodiments that are considered as useful at present are discussed above with various examples, it should be understood that such details are merely for the purpose of description, and the appended claims are not limited to the embodiments disclosed above and aim to include all amendments and equivalent combinations in accordance with the essence and scope of the embodiments in the specification. For example, although system components described above can be implemented by hardware devices, these components can also be implemented completely by software, for example, by installing the system described above on an existing processing device or mobile device.

Similarly, it should be noted that to simplify the expression in the specification to allow for a good understanding of one or more embodiments of the invention, multiple features may be combined in one embodiment, drawing or description thereof, in the description of the embodiments of the invention. However, this does not mean that features of the subject matter in the description are more than the feature of the subject matter in the claims. Actually, the features of the subject matter in the embodiments should be less than all features of a single embodiment disclosed above.

Descriptive or attributive figures are used in some embodiments. It should be understood that these figures used in the description of embodiments are modified by a qualifier "about", "approximately" or "generally" in some examples. Unless otherwise stated, qualifier "about", "approximately" or "generally" allows from a change within ±20% of these figures. Correspondingly, in some embodiments, numeric parameters used in the specification and claims are all approximate value, which may vary according to features required by some embodiments. In some embodiments, the number of decimal places of the numeric parameters should be taken into account and is retained as commonly needed. Although values and parameters for determining the scope of the invention are approximate in some embodiments in the specification, these values should be as accurate as possible within practicable ranges in specific embodiments.

Patents, patent applications, patent application disclosures and other materials such as articles, books, specifications, prints and documents cited in the specification are incorporated herein by reference in their entirety, excluding historical application documents inconsistent with or conflicting with the contents in the specification and documents limiting the broadest scope of the claims of the specification (added to the specification at present or later). It should be noted that where the description, definition and/or the use of terms in materials attached to the specification are inconsistent with or conflicting with the contents in the specification, the description, definition and/or the use of terms in the specifications shall be used as the criterion.

Finally, it should be understood that the embodiments in the specification are merely used for explaining the principle of the embodiments in the specification. Other transformations may also fall within the scope of the specification. Therefore, the embodiments in the specification are illustrative rather than restrictive. Alternative configurations of the embodiments in the specification should be construed as consistent with the teaching of the specification. Correspondingly, the embodiments of the application are not limited to the embodiments that are clearly introduced and described in the specification.

What is claimed is:

1. A method for detecting a leakage target by integrating temporal information, comprising:
   acquiring multiple frames of images of a target position, and arranging the multiple frames of images based on temporal information corresponding to the multiple frames of images to obtain a target image sequence;
   merging, in a channel dimension, the multiple frames of images in the target image sequence to obtain a multi-dimensional tensor;
   performing convolution processing on the multi-dimensional tensor to obtain a first output result, wherein the first output result is used for representing a frame difference between every two adjacent ones of the multiple frames of images;
   calculating an accumulated frame difference corresponding to the multiple frames of images based on the first output result; and
   inputting the accumulated frame difference to a trained target detection model as input data to obtain a second output result integrated with the temporal information, wherein the second output result is used for reflecting a probability of the presence of the leakage target at the target position and a class of the leakage target; wherein
   the calculating an accumulated frame difference corresponding to the multiple frames of images based on the first output result includes:
   calculating an accumulated channel difference corresponding to each of channels based on the frame difference between every two adjacent ones of the multiple frames of images, wherein the accumulated channel difference is used for representing a sum of absolute values of differences of every two adjacent ones of the multiple frames of images in a channel; and
   obtaining accumulated frame difference by summing the accumulated channel differences corresponding to the channels.

2. The method according to claim 1, wherein the trained target detection model is obtained by training through the following steps:
   acquiring a sample video, and extracting k+1 continuous image frames from the sample video;

determining an abustle value of a frame difference between every two adjacent ones of the k+1 continuous image frames to obtain absolute values of k frame differences;

adding the absolute values of the k frame differences to obtain an accumulated frame difference corresponding to the sample video;

constructing a sample data set using the accumulated frame difference as a model input sample;

labelling each model input sample in the sample data set to obtain a label corresponding to each model input sample; and inputting the labelled sample data set to an initial target detection model as input data, and iteratively updating a parameter of the initial target detection model based on the sample data set until a loss function or a number of training epochs reaches a preset threshold, so as to obtain the trained target detection model.

3. The method according to claim 2, wherein a labelled object corresponding to the labels is a leakage target in an accumulated frame difference image corresponding to the model input samples;

the label corresponding to each model input sample comprises <class id>, <x_center>, <y_center>, <width> and <height>, wherein <class id> is a class corresponding to the target, <x_center> and <y_center> are coordinates of a center of a bounding box corresponding to the target, and <width> and <height> are a width and height of the bonding box.

4. The method according to claim 3, wherein the initial target detection model is YOLOv5;

output data of the initial target detection model includes a prediction result of the bounding box, a probability of the presence of a leakage target, and a class of the leakage target;

the loss function comprises a loss of the bounding box, a loss of the probability of the presence of a leakage target, and a loss of the class of the leakage target.

5. The method according to claim 2, wherein iteratively updating a parameter of the initial target detection model based on the sample data set comprises:

estimating moving averages of a primary moment and a secondary moment of a gradient using an Adam optimization algorithm; and updating the parameter of the initial target detection model based on the moving averages of the primary moment and the secondary moment and a current learning rate.

6. The method according to claim 5, wherein the parameter of the initial target detection model is updated by the following rule:

$$\theta_{t+1} = \theta_t + \frac{\alpha}{\sqrt{\hat{v}_t} + \varepsilon} \hat{m}_t$$

where, $\theta_{t+1}$ is the parameter after updating, $\theta_t$ is the parameter before updating, $\hat{m}_t$ is the moving average of the primary moment, $\hat{v}_t$ is the moving average of the secondary moment, $\alpha$ is the current learning rate, and $\varepsilon$ is a fixed parameter.

7. The method according to claim 6, further comprising:

linearly adjusting the current learning rate in the first s training epochs, and adjusting the current learning rate in the last T-s training epochs by a cosine annealing learning rate adjustment strategy, wherein T is a total number of training epochs.

8. The method according to claim 7, wherein the cosine annealing learning rate adjustment strategy is specifically as follows:

$$lr(t) = 0.5 lr_{max}\left(1 + \cos\frac{\pi t}{T}\right)$$

where, $lr_{max}$ is a maximum learning rate, T is the total number of training epochs, t is a current training epoch, lr(t) is a learning rate corresponding to the current training epoch, and t>s.

9. A system for detecting a leakage target by integrating temporal information, comprising:

an acquisition module used for acquiring multiple frames of images of a target position and arranging the multiple frames of images based on temporal information corresponding to the multiple frames of images to obtain a target image sequence;

a multi-dimensional tensor generation module used for merging, in a channel dimension, the multiple frames of images in the target image sequence to obtain a multi-dimensional tensor;

a convolution processing module used for performing convolution processing on the multi-dimensional tensor to obtain a first output result, wherein the first output result is used for representing a frame difference between every two adjacent ones of the multiple frames of images;

an accumulated frame difference calculation module used for calculating an accumulated frame difference corresponding to the multiple frames of images based on the first output result; and a target detection module used for inputting the accumulated frame difference to a trained target detection model as input data to obtain a second output result integrated with the temporal information, wherein the second output result is used for reflecting a probability of the presence of the leakage target at the target position and a class of the leakage target; wherein when calculating the accumulated frame difference corresponding to the multiple frames of images based on the first output result, the accumulated frame difference calculation module is specifically used for calculating an accumulated channel difference corresponding to each of channels based on the frame difference between every two adjacent ones of the multiple frames of images; and obtaining accumulated frame difference by summing the accumulated channel differences corresponding to the channels, wherein the accumulated channel difference is used for representing a sum of absolute values of differences of every two adjacent ones of the multiple frames of images in a channel.

10. The system according to claim 9, further comprising a training module specifically used for:

acquiring a sample video, and extracting k+1 continuous image frames from the sample video;

determining an abustle value of a frame difference between every two adjacent ones of the k+1 continuous image frames to obtain absolute values of k frame differences;

adding the absolute values of the k frame differences to obtain an accumulated frame difference corresponding to the sample video;

constructing a sample data set using the accumulated frame difference as a model input sample;
labelling each model input sample in the sample data set to obtain a label corresponding to each model input sample; and
inputting the labelled sample data set to an initial target detection model as input data, and iteratively updating a parameter of the initial target detection model based on the sample data set until a loss function or a number of training epochs reaches a preset threshold, so as to obtain the trained target detection model.

* * * * *